(12) United States Patent
Yang et al.

(10) Patent No.: US 12,267,570 B2
(45) Date of Patent: *Apr. 1, 2025

(54) MACHINE LEARNING DEVICE, IMAGE PROCESSING DEVICE, MACHINE LEARNING METHOD, AND MACHINE LEARNING PROGRAM

(71) Applicant: JVCKENWOOD Corporation, Yokohama (JP)

(72) Inventors: Yincheng Yang, Yokohama (JP); Shingo Kida, Yokohama (JP); Hideki Takehara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 58 days.

This patent is subject to a terminal disclaimer.

(21) Appl. No.: 18/173,819

(22) Filed: Feb. 24, 2023

(65) Prior Publication Data
US 2023/0199281 A1    Jun. 22, 2023

Related U.S. Application Data

(63) Continuation of application No. PCT/JP2021/003568, filed on Feb. 1, 2021.

(30) Foreign Application Priority Data

Aug. 26, 2020  (JP) ................. 2020-142707

(51) Int. Cl.
*H04N 23/11*  (2023.01)
*G06V 10/70*  (2022.01)

(52) U.S. Cl.
CPC ............. *H04N 23/11* (2023.01); *G06V 10/70* (2022.01)

(58) Field of Classification Search
CPC .......... H04N 23/11; H04N 23/60; H04N 7/18; G06V 10/143; G06V 10/70; G06V 10/774; G06V 10/82
(Continued)

(56) References Cited

U.S. PATENT DOCUMENTS

2017/0322150 A1*  11/2017  Morimoto ............ G01N 21/274
2019/0349572 A1*  11/2019  Uemori ................ G06V 10/454
(Continued)

FOREIGN PATENT DOCUMENTS

| JP | 2002171519 A | 6/2002 | |
| JP | 2016122905 A | 7/2016 | |
| WO | WO-2022190301 A1 * | 9/2022 | ............. G06N 20/00 |

OTHER PUBLICATIONS

International Search Report from International Application No. PCT/JP2021/003568 mailed Apr. 20, 2021, 4 pages.
(Continued)

*Primary Examiner* — Behrooz M Senfi
(74) *Attorney, Agent, or Firm* — Shih IP Law Group, PLLC

(57) ABSTRACT

A visible light image generation model learning unit generates a trained visible light image generation model that generates a visible light image in a second time zone from a far-infrared image in a first time zone. The visible light image generation model learning unit includes a first learning unit that machine-learns the far-infrared image in the first time zone and a far-infrared image in the second time zone as teacher data and generates a trained first generation model that generates the far-infrared image in the second time zone from the far-infrared image in the first time zone, and a second learning unit that machine-learns the far-infrared image in the second time zone and the visible light image in the second time zone as teacher data and generates a trained second generation model that generates the visible
(Continued)

light image in the second time zone from the far-infrared image in the second time zone.

5 Claims, 6 Drawing Sheets

(58) Field of Classification Search
USPC .......................................................... 348/164
See application file for complete search history.

(56) References Cited

U.S. PATENT DOCUMENTS

| | | | |
|---|---|---|---|
| 2020/0193569 A1* | 6/2020 | Aoki | G06T 5/50 |
| 2023/0196739 A1* | 6/2023 | Kida | G06V 10/20 |
| | | | 382/159 |
| 2023/0199280 A1* | 6/2023 | Takehara | G06V 10/82 |
| | | | 348/164 |
| 2023/0199281 A1* | 6/2023 | Yang | G06V 10/82 |
| | | | 348/164 |
| 2023/0414114 A1* | 12/2023 | De Pelsemaeker | G16H 10/60 |

OTHER PUBLICATIONS

International Preliminary Report on Patentability from International Application No. PCT/JP2021/003568 mailed Feb. 28, 2023, 8 pages.

\* cited by examiner

MACHINE LEARNING DEVICE, IMAGE PROCESSING DEVICE, MACHINE LEARNING METHOD, AND MACHINE LEARNING PROGRAM

BACKGROUND OF THE INVENTION

1. Field of the Invention

The present invention relates to a technique for converting a far-infrared image into a visible light image.

2. Description of the Related Art

At night when there is no visible light, an infrared camera is used instead of a visible light camera to capture an image of an object. However, since far-infrared images do not include color image information, it is difficult to detect a specific object such as a person from far-infrared images. Therefore, a far-infrared image is converted into a visible light image in order to allow for easy recognition through human eyes.

According to Patent Literature 1, an infrared ray color image forming device is disclosed that obtains a two-dimensional spectral image of an object by irradiating the object with infrared rays and measuring the infrared spectral reflectance from the reflected infrared rays by two-dimensional scanning so as to artificially color each position in the spectral image.

In Patent Literature 2, an image processing device is disclosed in which a generating unit generates a color image by predicting the color of an object based on an infrared image and a control unit determines a candidate color based on the reliability of each color related to the prediction.

[Patent Literature 1] Japanese Patent Application Publication No. 2002-171519

[Patent Literature 2] Japanese Patent Application Publication No. 2016-122905

In order to convert an infrared image into a visible light image, it is necessary to accurately specify a color value for the pixel value of the infrared image, and there is a limit to improving the accuracy. Also, it is difficult to convert a nighttime infrared image into a daytime color image.

SUMMARY OF THE INVENTION

In this background, a purpose of the present invention is to provide a technique that allows for conversion of a far-infrared image into a visible light image with high accuracy.

A machine learning device according to one embodiment of the present invention includes: a far-infrared image training data acquisition unit that acquires a far-infrared image in a first predetermined time zone and a far-infrared image in a second predetermined time zone; a visible light image training data acquisition unit that acquires a visible light image in the second predetermined time zone; and a visible light image generation model learning unit that generates a trained visible light image generation model that generates the visible light image in the second predetermined time zone from the far-infrared image in the first predetermined time zone. The visible light image generation model learning unit includes: a first generation model learning unit that machine-learns the far-infrared image in the first predetermined time zone and the far-infrared image in the second predetermined time zone as training data, and generates a trained first generation model that generates the far-infrared image in the second predetermined time zone from the far-infrared image in the first predetermined time zone, and a second generation model learning unit that machine-learns the far-infrared image in the second predetermined time zone and the visible light image in the second predetermined time zone as training data, and generates a trained second generation model that generates the visible light image in the second predetermined time zone from the far-infrared image in the second predetermined time zone.

Another embodiment of the present invention relates to an image processing device. This device includes: a far-infrared image acquisition unit that acquires a far-infrared image; and a visible light image generation unit that inputs the acquired far-infrared image into a visible light image generation model machine-learned to generate a visible light image from the far-infrared image, and generates a visible light image. The visible light image generation unit includes: a first image conversion unit that inputs the acquired far-infrared image into a first generation model obtained by machine learning a far-infrared image in a first predetermined time zone and a far-infrared image in a second predetermined time zone as training data, and generates a far-infrared image in the second predetermined time zone, and a second image conversion unit that inputs the generated far-infrared image in the second predetermined time zone into a second generation model obtained by machine learning the far-infrared image in the second predetermined time zone and a visible light image in the second predetermined time zone as training data, and generates a visible light image in the second predetermined time zone.

Still another embodiment of the present invention relates to a machine learning method. This method includes: acquiring a far-infrared image in a first predetermined time zone and a far-infrared image in a second predetermined time zone; acquiring a visible light image in the second predetermined time zone; and generating a trained visible light image generation model that generates the visible light image in the second predetermined time zone from the far-infrared image in the first predetermined time zone. The generating a trained visible light image generation model includes: machine-learning the far-infrared image in the first predetermined time zone and the far-infrared image in the second predetermined time zone as training data, and generating a trained first generation model that generates the far-infrared image in the second predetermined time zone from the far-infrared image in the first predetermined time zone, and machine-learning the far-infrared image in the second predetermined time zone and the visible light image in the second predetermined time zone as training data, and generating a trained second generation model that generates the visible light image in the second predetermined time zone from the far-infrared image in the second predetermined time zone.

Optional combinations of the aforementioned constituting elements and implementations of the invention in the form of methods, apparatuses, systems, recording mediums, and computer programs may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
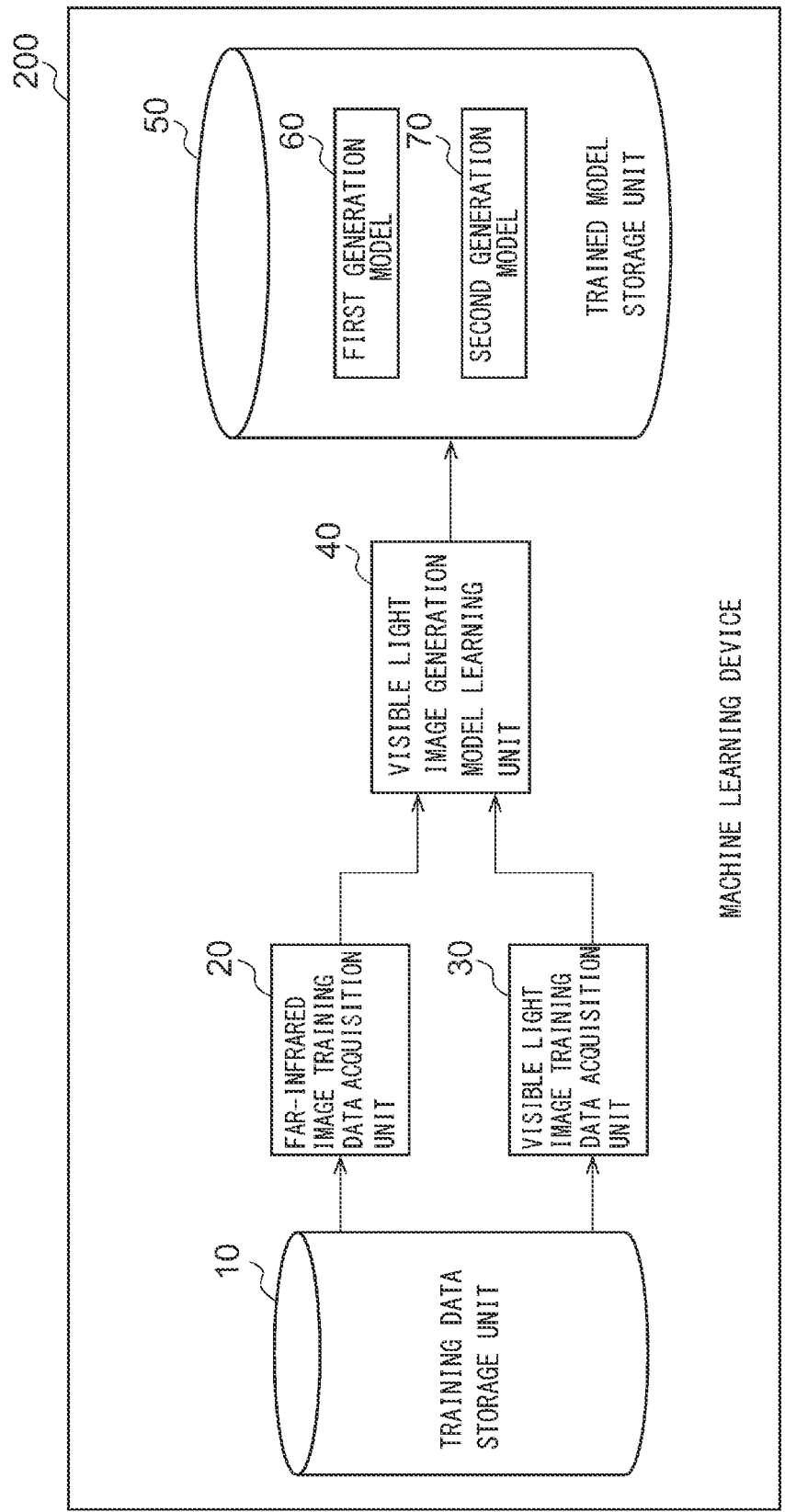
FIG. 1 is a configuration diagram of a machine learning device according to an embodiment.

FIG. 1 is a configuration diagram of a machine learning device 200 according to an embodiment. The machine learning device 200 includes a training data storage unit 10, a far-infrared image training data acquisition unit 20, a visible light image training data acquisition unit 30, a visible light image generation model learning unit 40, and a trained model storage unit 50.

The training data storage unit 10 stores a far-infrared image in a first predetermined time zone, a far-infrared image in a second predetermined time zone, and a visible light image in the second predetermined time zone as training data. As an example, the first predetermined time zone represents nighttime, and the second predetermined time zone represents daytime.

The far-infrared images are images captured by a far-infrared image capturing device in the first predetermined time zone and the second predetermined time zone, respectively. The visible light image is an image captured by a visible light image capturing device in the second predetermined time zone. Due to the different image-capturing time zones, the composition of the images, that is, the arrangement of a person or object whose image is to be captured is different in the far-infrared image in the first predetermined time zone and the far-infrared image in the second predetermined time zone. Since the far-infrared image in the second predetermined time zone and the visible light image in the second predetermined time zone are images captured in the same time zone by two types of image capturing devices, the far-infrared image capturing device and the visible light image capturing device, the composition of the images is almost the same.

The far-infrared image training data acquisition unit 20 acquires the far-infrared image in the first predetermined time zone and the far-infrared image in the second predetermined time zone as training data from the training data storage unit 10. The visible light image training data acquisition unit 30 acquires the visible light image in the second predetermined time zone as training data from the training data storage unit 10.

The visible light image generation model learning unit 40 generates a trained visible light image generation model that generates a visible light image in the second predetermined time zone from the far-infrared image in the first predetermined time zone. The visible light image generation model includes a first generation model 60 for generating the far-infrared image in the second predetermined time zone from the far-infrared image in the first predetermined time zone and a second generation model 70 for generating the visible light image in the second predetermined time zone from the far-infrared image in the second predetermined time zone. The visible light image generation model learning unit 40 stores the first generation model 60 and the second generation model 70 generated by machine learning in the trained model storage unit 50.

Figure 3:
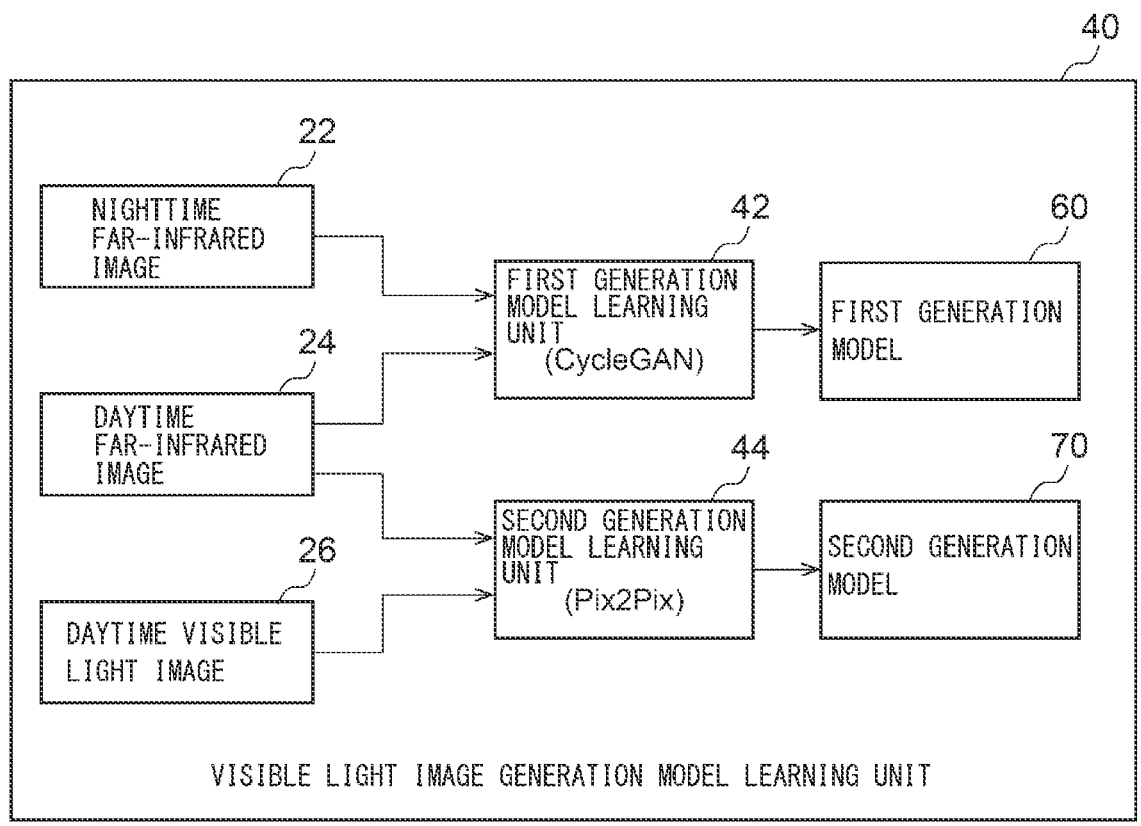
FIG. 3 is a configuration diagram of a visible light image generation model learning unit in FIG. 1.

FIG. 3 is a configuration diagram of the visible light image generation model learning unit 40. The visible light image generation model learning unit 40 includes a first generation model learning unit 42 and a second generation model learning unit 44. An explanation will be given regarding more detailed configuration of the visible light image generation model learning unit 40 with reference to FIG. 3. As an example, an explanation will be given on the assumption that the first predetermined time period is nighttime and the second predetermined time period is daytime.

The first generation model learning unit 42 machine-learns the far-infrared image in the first predetermined time zone (nighttime far-infrared image 22) and the far-infrared image in the second predetermined time zone (daytime far-infrared image 24) as training data and generates a trained first generation model 60 for generating the far-infrared image in the second predetermined time zone (daytime far-infrared image 24) from the far-infrared image in the first predetermined time zone (nighttime far-infrared image 22).

The second generation model learning unit 44 machine-learns the far-infrared image in the second predetermined time zone (daytime far-infrared image 24) and the visible light image in the second predetermined time zone (daytime visible light image 26) as training data and generates a trained second generation model 70 for generating the visible light image in the second predetermined time zone (daytime visible light image 26) from the far-infrared image in the second predetermined time zone (daytime far-infrared image 24).

As an example of machine learning, a generative adversarial network (GAN) is used. In a generative adversarial network, two neural networks, a generator and a discriminator, perform adversarial learning. Methods for learning image-to-image translation using generative adversarial networks include a method called CycleGAN and a method called Pix2Pix. In Pix2Pix, the image before conversion and the image after the conversion that are provided as a training dataset need to be paired in a one-to-one correspondence. However, in CycleGAN, learning can be done using a combination of images that are not an exact pair as a training dataset.

Since the first generation model learning unit 42 uses the nighttime far-infrared image 22 and the daytime far-infrared image 24 in different image-capturing time zones as training data, the image before the conversion and the image after the conversion do not have the same composition, and the dataset is not an exact pair. Therefore, the first generation model learning unit 42 uses CycleGAN that allows for learning even for a dataset that is not an exact pair.

To a CycleGAN model, the nighttime far-infrared image 22 is provided as input data, and the daytime far-infrared image 24 is provided as a true value (ground truth).

While preserving the outline of an input image, the CycleGAN model converts the style of the image to a ground truth. The dataset of the nighttime far-infrared image 22 and the daytime far-infrared image 24 provided to the CycleGAN model are pictures captured by the same far infrared camera at the same place, with only a difference in the image-capturing time zones, and is teaching data that can be easily learned by the CycleGAN model.

Since the second generation model learning unit 44 uses the daytime far-infrared image 24 and the daytime visible light image 26 in the same image-capturing time zone as training data, the image before the conversion and the image after the conversion have the same composition, and the dataset is paired. Therefore, the second generation model learning unit 44 uses Pix2Pix for learning for a paired dataset.

To a Pix2Pix model, the daytime far-infrared image 24 is provided as input data, and the daytime visible light image 26 is provided as a true value (ground truth). The dataset of the daytime far-infrared image 24 and the daytime visible light image 26 provided to Pix2Pix are pictures captured by different cameras, a far infrared camera and a visible light camera, at the same place and in the same image-capturing time zone, and is teaching data that can be easily learned by the Pix2Pix model.

The visible light image generation model learning unit 40 generates a two-step conversion machine-learning model of machine learning the conversion from the nighttime far-infrared image 22 into the daytime far-infrared image 24 and then the conversion from the daytime far-infrared image 24 into the daytime visible light image 26 instead of directly machine learning the conversion from the nighttime far-infrared image 22 into the daytime visible light image 26.

The nighttime far-infrared image 22 and the daytime far-infrared image 24 are both far-infrared images and are different only in the image-capturing time zones. Thus, the correlation is high. Further, the daytime far-infrared image 24 and the daytime visible light image 26 are different in terms of far infrared light and visible light but are in the same image-capturing time zone. Thus, the correlation is high. On the other hand, the nighttime far-infrared image 22 and the daytime visible light image 26 are different in terms of far-infrared light and visible light and are in different image-capturing time zones. Thus, the correlation is low.

The difficulty of conversion is low and the accuracy of learning is high in two-step conversion machine learning of machine leaning the conversion from the nighttime far-infrared image 22 into the daytime far-infrared image 24 and then machine learning the conversion from the daytime far-infrared image 24 into the daytime visible light image 26, compared to machine learning of the conversion from the nighttime far-infrared image 22 into the daytime visible light image 26 in one conversion.

Further, assuming an application for detecting an object from a captured image, an object detection model has higher detection accuracy in the case of a visible light image than the case of a far-infrared image. Even when machine learning is performed on an object detection model by a deep learning model or the like, since a person or an object can be detected by using color information of an image as long as the image is a visible light image, the detection accuracy can be improved. Further, when using trained models open to the public at the learning stage, trained models for visible light images are often open to the public, but trained models for far-infrared images are often not open to the public. Assuming application to object detection from captured images performed in this way, it is significant to be able to convert a nighttime far-infrared image into a daytime far-infrared image with high accuracy.

Figure 2:
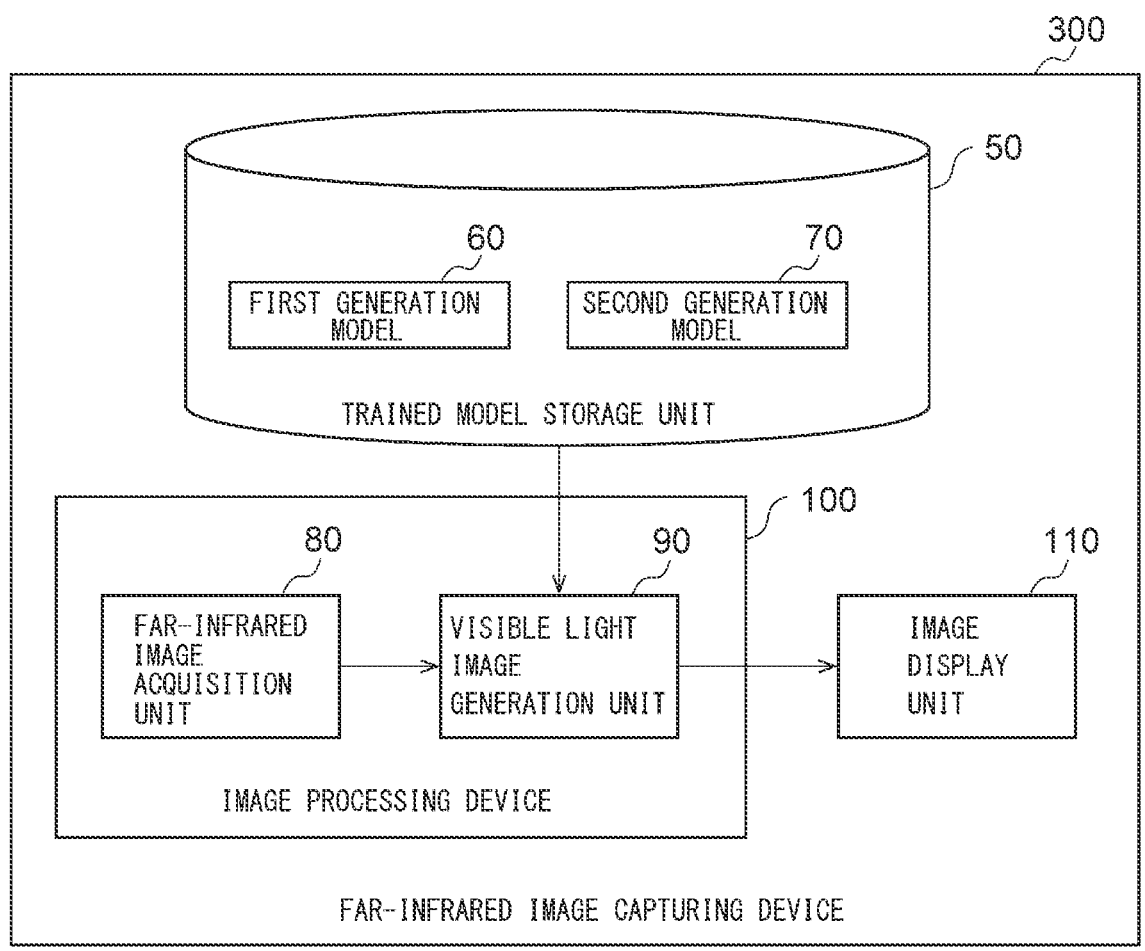
FIG. 2 is a configuration diagram of a far-infrared image capturing device according to an embodiment.

FIG. 2 is a configuration diagram of a far-infrared image capturing device 300 according to an embodiment. The far-infrared image capturing device 300 includes a trained model storage unit 50, an image processing device 100, and an image display unit 110. The image processing device 100 includes a far-infrared image acquisition unit 80 and a visible light image generation unit 90. The trained model storage unit 50 has the same configuration as the trained model storage unit 50 in FIG. 1, and the first generation model 60 and the second generation model 70 generated by machine learning by the visible light image generation model learning unit 40 are stored therein.

The far-infrared image acquisition unit 80 acquires a far-infrared image captured in the first predetermined time zone.

The visible light image generation unit 90 inputs a far-infrared image acquired by the far-infrared image acquisition unit 80 into a visible light image generation model machine-learned to generate a visible light image from the far-infrared image, and generates a visible light image. The visible light image generation model includes a first generation model 60 for generating the far-infrared image in the second predetermined time zone from the far-infrared image in the first predetermined time zone and a second generation model 70 for generating the visible light image in the second predetermined time zone from the far-infrared image in the second predetermined time zone. The visible light image generation unit 90 reads the first generation model 60 and the second generation model 70 generated by machine learning from the trained model storage unit 50. The image display unit 110 displays the visible light image generated by the visible light image generation unit 90.

Figure 4:
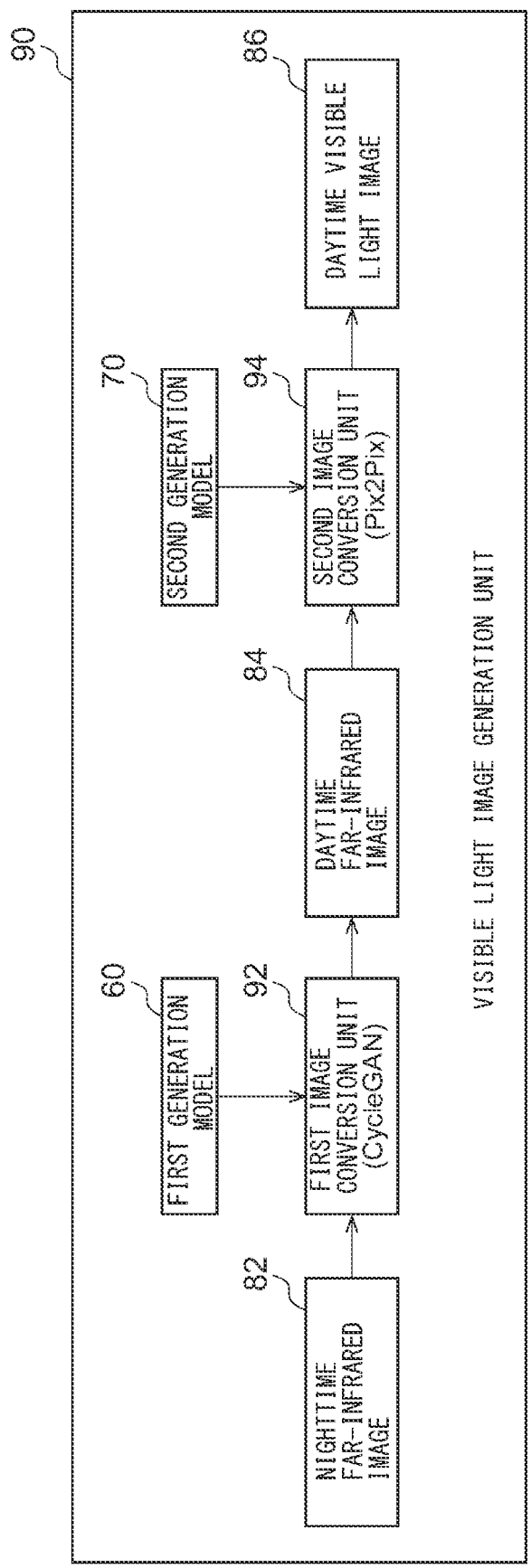
FIG. 4 is a configuration diagram of a visible light image generation unit in FIG. 2.

FIG. 4 is a configuration diagram of the visible light image generation unit 90. The visible light image generation unit 90 includes a first image conversion unit 92 and a second image conversion unit 94. An explanation will be given regarding more detailed configuration of the visible light image generation unit 90 with reference to FIG. 4. As an example, an explanation will be given on the assumption that the first predetermined time period is nighttime and the second predetermined time period is daytime.

The first image conversion unit 92 inputs the far-infrared image (nighttime far-infrared image 82) acquired by the far-infrared image acquisition unit 80 to the first generation model 60 obtained by machine learning the far-infrared image (nighttime far-infrared image 22) in the first predetermined time zone and the far-infrared image (daytime far-infrared image 24) in the second predetermined time zone as training data, and generates a far-infrared image (daytime far-infrared image 84) in the second predetermined time zone.

The second image conversion unit 94 inputs the far-infrared image (daytime far-infrared image 84) in the second predetermined time zone generated by the first image conversion unit 92 to the second generation model 70 obtained by machine learning the far-infrared image (daytime far-infrared image 84) in the second predetermined time zone and the far-infrared image (daytime far-infrared image 24) in the second predetermined time zone as training data, and generates a far-infrared image (daytime visible light image 86) in the second predetermined time zone.

Figure 5:
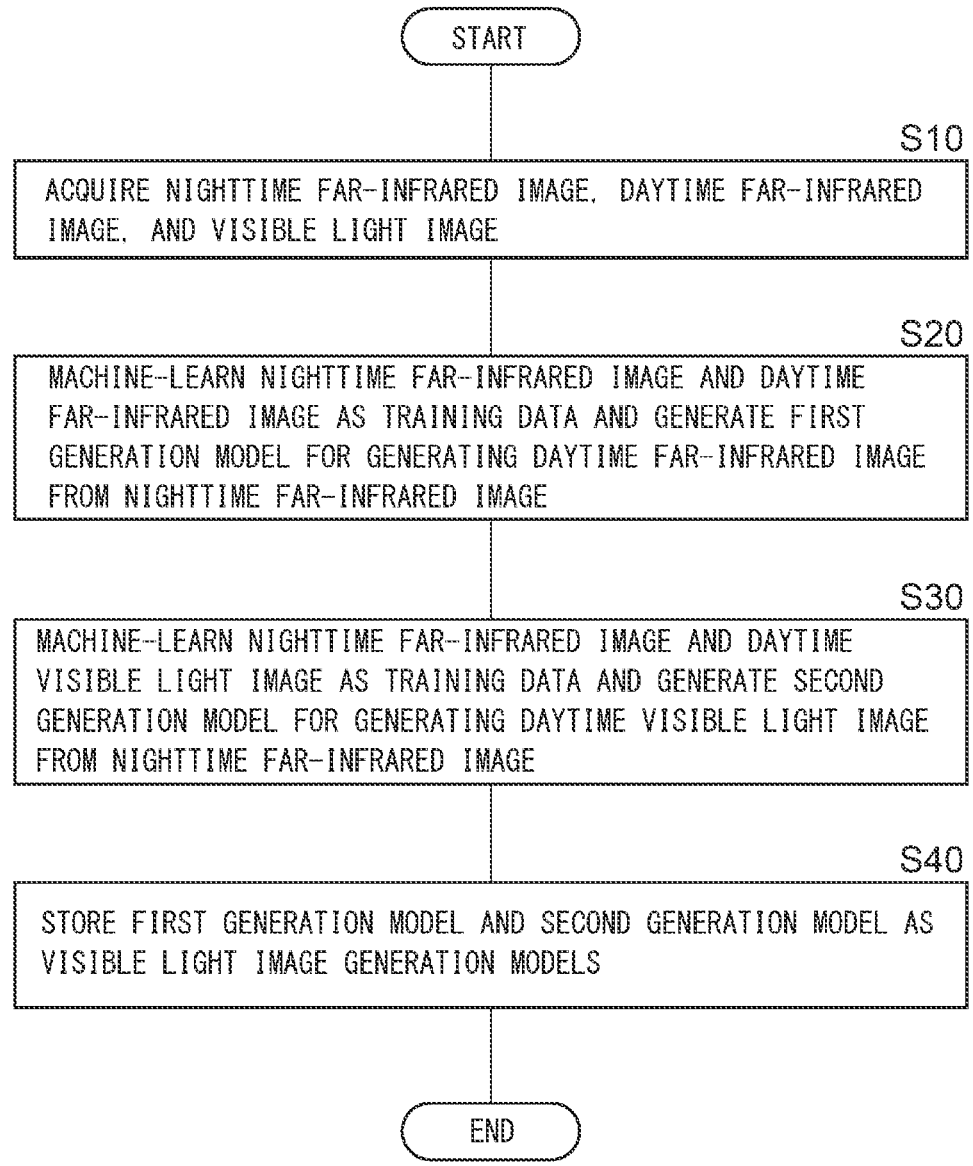
FIG. 5 is a flowchart explaining a procedure for machine-learning a visible light image generation model for generating a daytime visible light image from a nighttime far-infrared image by the machine learning device of FIG. 1.

FIG. 5 is a flow chart explaining a procedure for machine-learning a visible light image generation model for generating a daytime visible light image from a nighttime far-infrared image by the machine learning device 200.

The machine learning device 200 acquires a nighttime far-infrared image 22, a daytime far-infrared image 24, and a daytime visible light image 26 from the training data storage unit 10 (S10).

The machine learning device 200 generates a first generation model 60 for generating the daytime far-infrared image 24 from the nighttime far-infrared image 22 by machine learning where the nighttime far-infrared image 22 and the daytime far-infrared image 24 serve as training data (S20).

The machine learning device 200 generates a second generation model 70 for generating the daytime visible light image 26 from the daytime far-infrared image 24 by machine learning where the daytime far-infrared image 24 and the daytime visible light image 26 serve as training data (S30).

The machine learning device 200 stores the first generation model 60 and the second generation model 70 as visible light image generation models in the trained model storage unit 50 (S40).

Figure 6:
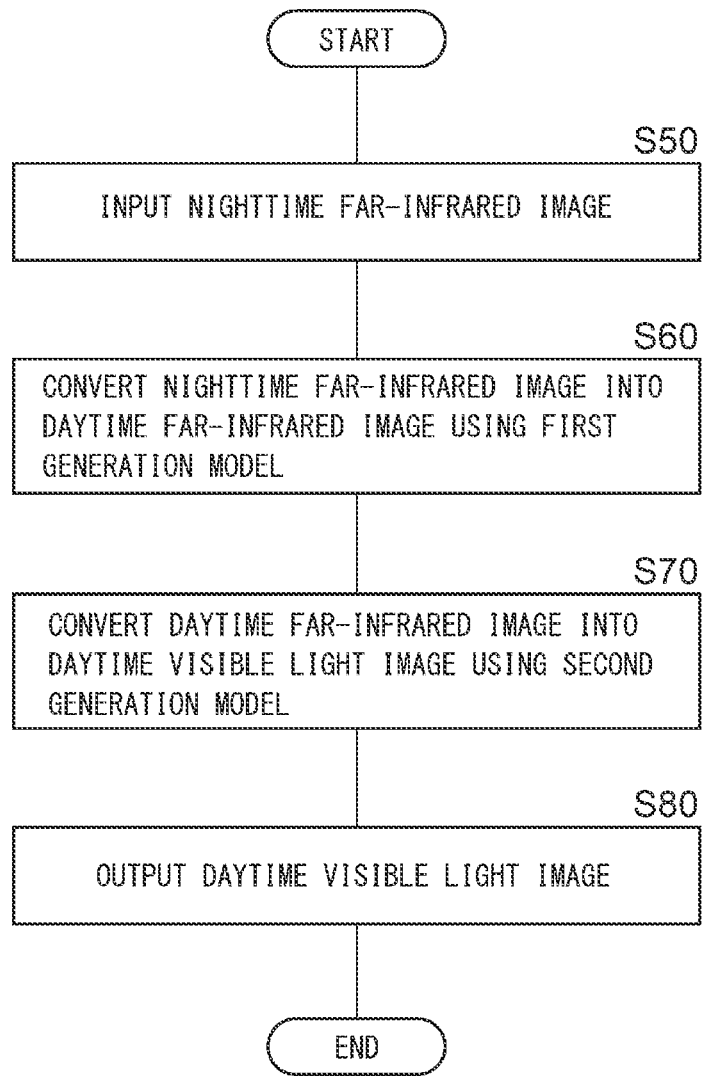
FIG. 6 is a flowchart for explaining a procedure for converting a nighttime far-infrared image into a daytime visible light image by the image processing device of FIG. 2.

FIG. 6 is a flowchart for explaining a procedure for converting a nighttime far-infrared image into a daytime visible light image by the image processing device 100.

The image processing device 100 inputs the nighttime far-infrared image 82 captured by the far-infrared image capturing device 300 (S50).

The image processing device 100 uses the first generation model 60 generated by machine learning where the nighttime far-infrared image 22 and the daytime far-infrared image 24 serve as training data so as to convert the nighttime far-infrared image 82 into the daytime far-infrared image 84 (S60).

The image processing device 100 uses the second generation model 70 generated by machine learning where the daytime far-infrared image 24 and the daytime visible light image 26 serve as training data so as to convert the daytime far-infrared image 84 into the daytime visible light image 86 (S70).

The image processing device 100 outputs the daytime visible light image 86 generated by two-step conversion (S80). The daytime visible light image 86 is used for object detection and the like.

The various processes of the image processing device 100, the machine learning device 200, and the far-infrared image capturing device 300 explained above can be realized as a device using hardware such as a CPU and memory. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be transmitted to and/or received from a server via a wired or wireless network. Still alternatively, the programs may be transmitted and/or received in the form of data transmission over terrestrial or satellite digital broadcast systems.

As described above, according to the embodiment of the present invention, instead of directly converting a daytime visible light image from a nighttime far-infrared image, two-step conversion of converting a nighttime far-infrared image into a daytime far-infrared image and then converting the daytime far-infrared image into a daytime visible light image is performed, thereby allowing for the generation of a daytime visible light image from a nighttime far-infrared image with high accuracy.

At night when there is no visible light, it is easier to capture an image of an object with an infrared camera than a visible light camera. However, since nighttime far-infrared images do not include color image information, it is difficult to detect an object. The use of the machine learning device 200 and the image processing device 100 according to the embodiment of the present invention allows for the conversion of a nighttime far-infrared image into a daytime visible light image with high accuracy, and the detection of an object thus becomes easy.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

What is claimed is:

1. A machine learning device comprising:
   a far-infrared image training data acquisition unit that acquires a far-infrared image in a first predetermined time zone and a far-infrared image in a second predetermined time zone;
   a visible light image training data acquisition unit that acquires a visible light image in the second predetermined time zone; and
   a visible light image generation model learning unit that generates a trained visible light image generation model that generates the visible light image in the second predetermined time zone from the far-infrared image in the first predetermined time zone,
   wherein the visible light image generation model learning unit includes:
      a first generation model learning unit that machine-learns the far-infrared image in the first predetermined time zone and the far-infrared image in the second predetermined time zone as training data, and generates a trained first generation model that generates the far-infrared image in the second predetermined time zone from the far-infrared image in the first predetermined time zone, and
      a second generation model learning unit that machine-learns the far-infrared image in the second predetermined time zone and the visible light image in the second predetermined time zone as training data, and generates a trained second generation model that generates the visible light image in the second predetermined time zone from the far-infrared image in the second predetermined time zone.

2. An image processing device comprising:
   a far-infrared image acquisition unit that acquires a far-infrared image; and
   a visible light image generation unit that inputs the acquired far-infrared image into a visible light image generation model machine-learned to generate a visible light image from the far-infrared image, and generates a visible light image,
   wherein the visible light image generation unit includes:
      a first image conversion unit that inputs the acquired far-infrared image into a first generation model obtained by machine learning a far-infrared image in a first predetermined time zone and a far-infrared image in a second predetermined time zone as training data, and generates a far-infrared image in the second predetermined time zone, and
      a second image conversion unit that inputs the generated far-infrared image in the second predetermined time zone into a second generation model obtained by machine learning the far-infrared image in the second predetermined time zone and a visible light image in the second predetermined time zone as training data, and generates a visible light image in the second predetermined time zone.

3. The image processing device according to claim 2, wherein the far-infrared image in the second predetermined time zone and the visible light image in the second predetermined time zone that are serving as the training data in the second generation model have the same composition.

4. A machine learning method comprising:
acquiring a far-infrared image in a first predetermined time zone and a far-infrared image in a second predetermined time zone;
acquiring a visible light image in the second predetermined time zone; and
generating a trained visible light image generation model that generates the visible light image in the second predetermined time zone from the far-infrared image in the first predetermined time zone,
wherein the generating a trained visible light image generation model includes:
machine-learning the far-infrared image in the first predetermined time zone and the far-infrared image in the second predetermined time zone as training data, and generating a trained first generation model that generates the far-infrared image in the second predetermined time zone from the far-infrared image in the first predetermined time zone, and
machine-learning the far-infrared image in the second predetermined time zone and the visible light image in the second predetermined time zone as training data, and generating a trained second generation model that generates the visible light image in the second predetermined time zone from the far-infrared image in the second predetermined time zone.

5. A non-transitory recording medium comprising a machine learning program comprising computer-implemented modules including:
a far-infrared image training data acquisition module that acquires a far-infrared image in a first predetermined time zone and a far-infrared image in a second predetermined time zone;
a visible light image training data acquisition module that acquires a visible light image in the second predetermined time zone; and
a visible light image generation model learning module that generates a trained visible light image generation model that generates the visible light image in the second predetermined time zone from the far-infrared image in the first predetermined time zone,
wherein the visible light image generation model learning module includes:
a first generation model learning module that machine-learns the far-infrared image in the first predetermined time zone and the far-infrared image in the second predetermined time zone as training data, and generates a trained first generation model that generates the far-infrared image in the second predetermined time zone from the far-infrared image in the first predetermined time zone, and
a second generation model learning module that machine-learns the far-infrared image in the second predetermined time zone and the visible light image in the second predetermined time zone as training data, and generates a trained second generation model that generates the visible light image in the second predetermined time zone from the far-infrared image in the second predetermined time zone.

* * * * *